United States Patent Office 3,397,239
Patented Aug. 13, 1968

3,397,239
PROCESS FOR PURIFYING 2 - (1 - CYCLO-HEXENYL)CYCLOHEXANONE BY FRACTIONAL CRYSTALLIZATION
Kenneth K. Kelly, Penn Hills Township, Allegheny County, and Joseph S. Matthews, O'Hara Township, Allegheny County, Pa., assignors to Gulf Research & Development Company, Pittsburgh, Pa., a corporation of Delaware
No Drawing. Filed May 22, 1967, Ser. No. 640,332
6 Claims. (Cl. 260—586)

ABSTRACT OF THE DISCLOSURE

A process for separating 2 - (1 - cyclohexenyl)cyclohexanone from a mixture of 2-(1-cyclohexenyl)cyclohexanone and 2-cyclohexylidenecyclo-hexanone by fractional crystallization from a hydrocarbon solvent.

---

This invention relates to a novel process for separating 2 - (1 - cyclohexenyl)cyclohexanone from a mixture of 2 - (1 - cyclohexenyl)cyclohexanone and 2 - cyclohexylidenecyclohexanone, and more particularly it relates to a process for crystallizing 2-(1-cyclohexenyl)cyclohexanone from a mixture of 2-(1-cyclohexenyl)cyclohexanone and 2-cyclohexylidenecyclohexanone in a hydrocarbon solvent.

In the following specification 2 - (1 - cyclohexenyl)cyclohexanone will be referred to as A and 2-cyclohexylidenecyclohexanone will be referred to as B.

The condensation of cyclohexanone in the presence of an appropriate condensation catalyst at a temperature suitable for condensation will result in a product mixture of A and B with lesser amounts of higher condensation products and unreacted cyclohexanone. The relative proportion of A and B is in part dependent upon the temperature at which the condensation reaction is carried out; however, in reviewing a significant number of condensation reactions at different temperatures and using different catalysts, we ascertained that in all instances A was the predominant condensation product by a ratio of about 15:1. We believe that the predominance of A, at least in part, results from the fact that it is the more stable form of these two structures according to the equilibrium equation

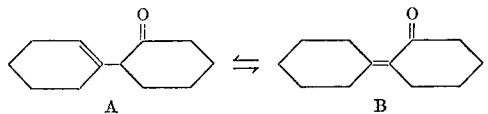

It is an easy matter to separate A and B from this mixture of condensation products by distillation; however, to our knowledge there is no satisfactory method for separating A from a mixture of A and b. We found distillation and isomerization of B to A to be unsatisfactory methods for obtaining pure A. We also ascertained that the formation and separation of chemical derivatives of these compounds is not satisfactory. Separation by physical means presents a difficult problem since these two isomers differ from one another only in the position of one double bond.

According to our invention, we have discovered that A can be separated from a mixture of A and B by fractional crystallization and that this separation can be effected to produce A in substantially pure form. We have found that A has a melting point of 7° C., while the melting point of B is about 57° C. Notwithstanding this significantly lower melting point of A, we have discovered that A will crystallize out of a mixture of A and B at a depressed temperature if the mixture of A and B is dissolved in a suitable amount of an appropriate hydrocarbon solvent. A saturated branched or straight chain hydrocarbon having from about 4 to about 10 carbon atoms is a satisfactory solvent. We prefer pentane or hexane as the solvent.

The hydrocarbon solvent must be present above a minimum concentration to obtain separation. The undiluted mixture of isomers will form a glass-like solid upon cooling. A solution containing 20 weight percent of the hydrocarbon solvent will produce crystals of both isomers upon cooling without effecting separation. We have found that a solution containing at least about 40 weight percent of the hydrocarbon solvent must be utilized in order to obtain preferential crystallization of A. These crystals of A will entrap a minor but substantially constant amount of the solvent containing some B. As a result, substantially complete separation requires successive crystallizations. We have made an 81 percent recovery of pure A from a starting mixture containing 94 weight percent A by three successive crystallizations using 50 weight percent pentane solutions in each crystallization step.

The greater the proportion of the hydrocarbon solvent that is used, the greater the purity of A that is crystallized out since the trapped solvent is more dilute in B. However, this is concomitant with a lower total recovery of A since uncrystallized A remains in the excess hydrocarbon solvent after crystallization. However, the smaller the amount of hydrocarbon solvent that is used, the greater the number of crystallization steps that may be required to obtain desired purity of A. Therefore, the procedure requires a material and economic balance to ascertain the amount of solvent required to obtain economic recovery of A of predetermined purity. We have found that solutions containing from about 40 to 70 weight percent hydrocarbon solvent are desirable for good recovery and purity of A with solutions containing about 50 weight percent hydrocarbon solvent being very satisfactory. In light of these considerations this procedure is most useful with mixtures of the isomers containing at least about 50 percent A and more preferably containing at least about 75 percent A.

In carrying out this procedure the solution is cooled to the temperature at which A crystallizes out, that is down to about −30° to −40° C. The crystals are then separated, such as by filtration, decantation, centrifuging or the like, from the liquid phase and redissolved in additional solvent for further purification if desired. The following example illustrates a procedure for carrying out our invention.

A mixture of 45.5 g. A and 3.2 g. B dissolved in 48.7 g. n-pentane was placed in an 8-inch test tube. The tube was attached to a controlled rate lowering device with the tip of the tube touching a dry ice-acetone mixture held at −35° C. After the first crystals formed in the tip of the tube, the tube was lowered into the cooling bath at the rate of two mm. per minute until approximately 80 percent of the tube's contents was submerged in the bath. The tube was then withdrawn and the liquid portion in the tube decanted off. The material remaining in the tube was redissolved in a sufficient amount of fresh n-pentane to reestablish a 50–50 weight percent solvent-ketone solution together with the trapped solvent and the procedure was repeated. The following table sets forth the results obtained by three successive crystallizations.

| Composition at Start (gms.) | | | Composition of Solid (gms.) | | | Decanted Solution (gms.) | | |
|---|---|---|---|---|---|---|---|---|
| n-C5 | A[1] | B[2] | n-C5 | A | B | n-C5 | A | B |
| 48.7 | 45.5 | 3.2 | 11.2 | 40.9 | 1.81 | 37.5 | 4.7 | 1.34 |
| 42.7 | 40.9 | 1.8 | 10.8 | 38.0 | [3] 0.66 | 31.9 | 2.9 | 1.15 |
| 36.2 | 35.6 | 0.6 | 12.0 | 34.3 | 0.3 | 24.2 | 1.3 | 0.31 |
|  |  |  |  |  |  |  | 8.9 | 2.70 |

[1] 2-(1-cyclohexenyl)cyclohexanone.
[2] 2-cyclohexylidenecyclohexanone.
[3] Results after removal of 2.9 gm. sample for U.V. analysis.

According to the material balance in this table, 2.80 gms. of B were removed compared with 3.2 gms. present in the starting mixture of isomers, indicating that 11 percent of B still remains in the purified fraction of A. However, both ultraviolet analysis and nuclear magnetic resonance spectrometric analysis indicated that none of B was present in the 34.3 gm. quantity of purified A. This difference was attributed to experimental error in making the material balance which is within reasonable limits. This procedure of three successive crystallizations resulted in an 80.6 percent recovery of pure A, the computation taking into consideration the 2.9 gm. crystalline sample removed from the system after the second crystallization.

Compound A has been reported to be a good herbicide against grasses, such as cheat grass, in truck garden crops, such as strawberries and beans. It is also reported to be a good fungicide and insecticide particularly suitable for treating wood. It is also useful as an intermediate in chemical synthesis.

It is to be understood that the above disclosure is by way of specific example and that numerous modifications and variations are available to those of ordinary skill in the art without departing from the true spirit and scope of our invention.

We claim:

1. A method for separating 2-(1-cyclohexenyl)cyclohexanone from a mixture of 2-(1-cyclohexenyl)cyclohexanone and 2-cyclohexylidenecyclohexanone which comprises dissolving said mixture in a hydrocarbon solvent selected from the group consisting of saturated straight and branch chain hydrocarbons having from four to ten carbon atoms and mixtures thereof to form a solution containing at least about 40 percent of said solvent, cooling the said solution to cause crystals of 2-(1-cyclohexenyl)cyclohexanone richer in 2-(1-cyclohexenyl)cyclohexanone than the starting mixture to deposit therefrom, and recovering the crystals of purified 2-(1- cyclohexenyl)cyclohexanone.

2. A method in accordance with claim 1 in which said solution contains from about 40 percent to about 70 percent of said hydrocarbon solvent.

3. A method in accordance with claim 1 in which the crystallization temperature is from about —30° C. to about —40° C.

4. A method in accordance with claim 3 in which the solvent is selected from pentane and hexane.

5. A method in accordance with claim 1 in which said crystals of purified 2-(1-cyclohexenyl)cyclohexanone are redissolved in fresh hydrocarbon solvent to form a second solution, cooling said second solution to cause crystals of 2(1-cyclohexenyl)cyclohexanone richer in 2-(1-cyclohexenyl)-cyclohexanone than the said purified 2-(1-cyclohexenyl)cyclohexanone to deposit therefrom, and recovering the crystals of further purified 2-(1-cyclohexenyl)cyclohexanone.

6. A method in accordance with claim 5 in which said crystals of further purified 2-(1-cyclohexenyl)cyclohexanone are dissolved in fresh hydrocarbon solvent to form a third solution, cooling said third solution to cause crystals of 2-(1-cyclohexenyl)cyclohexanone richer in 2-(1-cyclohexenyl)cyclohexanone than the said further purified 2-(1-cyclohexenyl)cyclohexanone to deposit therefrom, and recovering the crystals of still further purified 2-(1-cyclohexenyl)cyclohexanone.

References Cited

UNITED STATES PATENTS

| 2,881,230 | 4/1959 | Buell | 260—707 |
| 2,861,112 | 11/1958 | Christensen et al. | 260—580 |
| 2,764,878 | 10/1956 | Hachmuth | 260—707 |

BERNARD HELFIN, *Primary Examiner.*

M. JACOB, *Assistant Examiner.*